United States Patent [19]

Kasahara

[11] Patent Number: 5,391,124
[45] Date of Patent: Feb. 21, 1995

[54] POWER TRANSMISSION FOR DRIVING AN OUTPUT SHAFT OF A STEERABLE HOUSING HAVING A DIFFERENTIAL WITH COMPENSATION FOR STEERING TORQUES

[76] Inventor: Fumio Kasahara, 467 Yashiki, Higashibessho-cho, Anjo-shi, Aich-ken, 446, Japan

[21] Appl. No.: 2,483

[22] Filed: Jan. 8, 1993

[30] Foreign Application Priority Data

Jan. 10, 1992 [JP] Japan .................. 4-021742
Aug. 19, 1992 [JP] Japan .................. 4-244233
Dec. 24, 1992 [JP] Japan .................. 4-359055

[51] Int. Cl.⁶ .................. F16H 1/00; F16H 1/20
[52] U.S. Cl. .................. 475/198; 475/206; 74/665 GB; 74/665 GC; 74/665 K
[58] Field of Search .............. 475/198, 206; 74/665 F, 74/665 G, 665 GB, 665 GC, 665 K; 180/252, 261

[56] References Cited

U.S. PATENT DOCUMENTS 5,024,639 6/1991 Crispo .................. 475/221

FOREIGN PATENT DOCUMENTS 1557934 1/1969 France .
4041898 7/1991 Germany .................. 475/198
60-157921 8/1985 Japan .
61-181789 8/1986 Japan .
4-262149 9/1992 Japan .
6918491 6/1971 Netherlands .
1587291 8/1990 U.S.S.R. .................. 475/198

Primary Examiner—Dirk Wright
Assistant Examiner—Khoi Q. Ta
Attorney, Agent, or Firm—Cushman, Darby & Cushman

[57] ABSTRACT

Herein disclosed is a power transmission which comprises: two housings coupled to rotate relative to each other; an input shaft rotatably borne in one of the housings; an output shaft rotatably borne in the other housing; two transmission paths coaxially arranged on the axis of the relative rotations of the two housings; a first transmission mechanism for transmitting rotations between the input shaft or the output shaft and the two transmission paths to rotate the two transmission paths in opposite directions; and a second transmission mechanism for transmitting rotations between the other of the input shaft or the output shaft and the two transmission paths to rotate the two transmission paths in the opposite directions and for absorbing the difference, which is caused by the relative rotations of the two housings, between the rotating speeds of the two transmission paths.

10 Claims, 9 Drawing Sheets

POWER TRANSMISSION FOR DRIVING AN OUTPUT SHAFT OF A STEERABLE HOUSING HAVING A DIFFERENTIAL WITH COMPENSATION FOR STEERING TORQUES

BACKGROUND OF THE INVENTION

1. Field of the Invention

The present invention relates to a general-purpose power transmission and, more particularly, to a power transmission to be incorporated into a variety of mechanisms including a mechanism, which has its drive unit and driven unit coupled to rotate relative to each other, such as: a steering wheel drive mechanism for use in various vehicles including motor cycles, bicycles, four-wheel automobiles, fork-lifts, elevation-working cars, three-wheeled buggies, three-wheeled tractors or snowmobiles of front drive, rear drive or front/rear drive type; a propelling mechanism for marine vessels; a propelling mechanism for airplanes such as V/STOLs; a spring drive mechanism for tools; a hand mechanism for robots; or an oscillating mechanism for fans or wind power plants.

2. Description of the Prior Art

A vehicle of front/rear drive type known in the prior art is exemplified by the three-wheeled buggies which are disclosed in Japanese Patent Laid-Open Nos. 157921/1985 and 181789/1986, for example. FIG. 10 is a schematic top plan view showing a front drive mechanism of such three-wheeled buggies. In this front drive mechanism of the prior art, an engine (although not shown) has its revolution transmitted through a drive chain 51, a power transmission 52 and a driven chain 53 to a front wheel 54. The power transmission 52 is constructed to include: an input shaft 55 connected to a body (although not shown); an output shaft 57 connected to a handle 56; and a synchronized ball joint 58 for coupling the two shafts 55 and 57 rotatably. Thus, even if the angle of deflection between the input shaft 55 and the output shaft 57 fluctuates as the handle 56 is steered, the synchronized ball joint 58 can still transmit the power to the front wheel 54. Although the synchronized ball joint 58 is transversely arranged, as shown in FIG. 10, similar functions could be retained even if the ball joint 58 should be so longitudinally arranged that the direction of transmission might be changed by a bevel gear.

There is also known in the prior art the motorcycle of front/rear drive type which uses a synchronized ball joint similar to that of the buggy in the power transmission to the front wheel. As the working car of front drive type, there is further known the three-wheeled tractor which has its engine mounted in the front of its body so that its handle is steered to turn the engine together with the front wheel.

Here, the power transmission 52 of the three-wheeled buggy and the motor cycle of the prior art uses the synchronized ball joint 58 so that the input shaft 55 and the output shaft 57 have to be arranged on a common line thereby to have an enlarged width. This raises a problem that a space for mounting the power transmission 52 is limited of itself. If the torque is to be increased with the handle 56 being steered, the synchronized ball joint 58 will return the output shaft 57 to the position aligned with the input shaft 55. This raises another problem that the returning force of the handle 56 is increased. Still another but important problem is that the working angle of the synchronized ball joint 58 is limited to a constant value. This makes it impossible to apply the power transmission 52 of the prior art to a mechanism in which the drive unit and the drive unit are so coupled as to rotate completely around without angular limitations. In the three-wheeled tractor of the prior art, moreover, the vibration of the engine is transmitted directly to the handle, but still the worse the steerability of the handle is deteriorated by turning the heavy engine for the steering.

SUMMARY OF THE INVENTION

An object of the present invention is to provide a power transmission which can be applied even to a mechanism having its drive unit and driven unit coupled to rotate within a predetermined angular range but completely around without angular limitation and which is further enabled to increase the degree of freedom for its mounting space, to prevent the relative rotation of a housing even with fluctuations in the torque or load, and to eliminate the interference between the relative rotation of the housing and the rotations of the input shaft and the output shaft.

In order to solve the above-specified objects, according to the present invention, there is provided a power transmission comprising: two housings coupled to rotate relative to each other; an input shaft rotatably borne in one of said housings; an output shaft rotatably borne in the other housing; two transmission paths coaxially arranged on the axis of the relative rotations of said two housings; a first transmission mechanism for transmitting rotations between said input shaft or said output shaft and said two transmission paths to rotate said two transmission paths in opposite directions; and a second transmission mechanism for transmitting rotations between the other of said input shaft or said output shaft and said two transmission paths to rotate said two transmission paths in the opposite directions and for absorbing the difference, which is caused by the relative rotations of said two housings, between the rotating speeds of said two transmission paths.

Here, the "two housings" can be so coupled as to rotate relative to each other completely around without angular limitation but can naturally be so coupled as to rotate within a predetermined angular range. Both the "input shaft" and the "output shaft" may be directly at a right angle with respect to the axis of relative rotations of the housings, but one of them may be directed at a right angle with respect to the axis of relative rotations of the housings whereas the other may be aligned with the axis of relative rotations of the housings. The "first transmission mechanism" can be exemplified by a construction including a bevel gear fixed on one of the input shaft and the output shaft and bevel gears individually mounted on the two transmission paths and simultaneously meshing with the former bevel gear. The "second transmission mechanism" is generally exemplified by a differential mechanism for transmitting the two transmission paths in the opposite directions. The differential mechanism can be exemplified by either a construction including a bevel gear or a double-pinion planetary bear unit. In the second transmission mechanism, a mechanism for rotating the two transmission paths in the opposite directions can be incorporated into the differential mechanism or constructed by a gear other than that of the differential mechanism.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE PREFERRED EMBODIMENTS

Since the two housings can be so coupled to each other as to rotate completely around without angular limitation or within a predetermined angular range, according to the power transmission of the present invention, the directions of the input shaft and the output shaft can be arbitrarily changed by rotating those housings to each other. As a result, the present power transmission can be applied even to the mechanism which has its drive unit and driven unit coupled to rotate not only within a predetermined angular range but also completely around without angular limitation. Moreover, since the input shaft and the output shaft need not be aligned to each other unlike the aforementioned prior art, the degree of freedom for their mounting space is improved.

In the present power transmission, the rotation of the input shaft, if rotated, is branched and transmitted by the first transmission mechanism (or the second transmission mechanism) to the two transmission paths so that these two transmission paths are rotated in the opposite directions on the axis of the relative rotations of the two housings. These opposite rotations are transmitted together by the second transmission mechanism (or the first transmission mechanism) to the output shaft. Moreover, even if a torque fluctuation is caused in the input shaft or if a load fluctuation is caused in the output shaft, these fluctuations are balanced by the synchronized rotations of the two transmission paths, with which the first transmission mechanism and the second transmission mechanism are in meshing engagement, in the opposite directions on the axis of relative rotations of the two housings. As a result, no couple of forces is established in the two housings by the aforementioned fluctuations so that the two housings will not rotate in response to each other.

If the two housings are then rotated relative to each other while the input shaft and the output shaft are rotating, a difference is established between the rotating speeds of the two transmission paths which are rotating in the opposite directions to each other (although the two transmission paths will rotate in the same direction if the two housings are rotated relative to each other while the input shaft and the output shaft stand still). However, this difference in the rotating speed is absorbed by the second transmission mechanism so that the relative rotations of the two housings and the rotations of the input shaft and the output shaft are completely isolated and kept away from interfering with each other.

Figure 1:
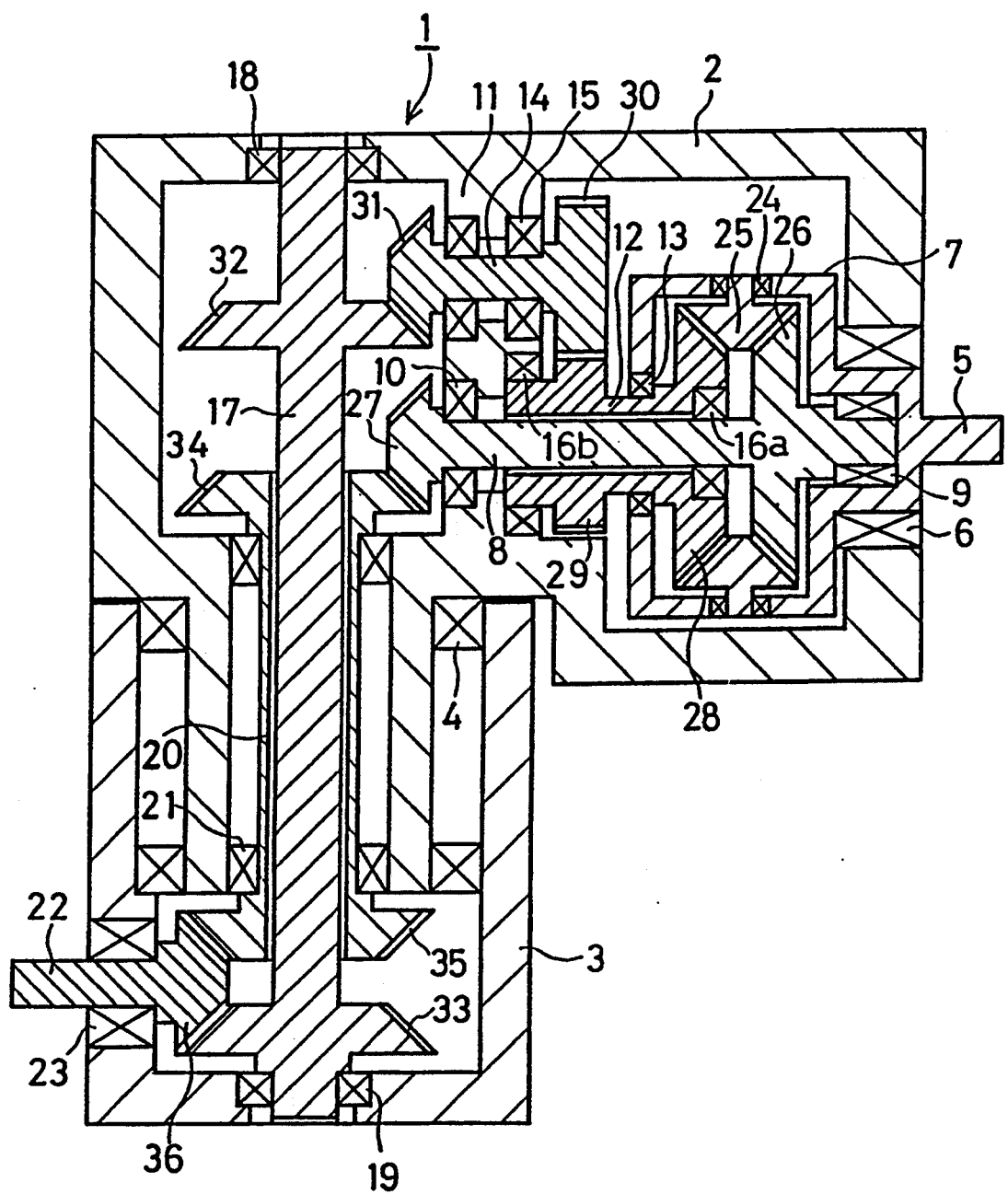
FIG. 1 is a section showing a power transmission according to a first embodiment of the present invention.

A first embodiment embodying the present invention will be described in the following with reference to FIGS. 1 and 2. As shown in FIG. 1, a power transmission 1 of the present embodiment is equipped with a first housing 2 and a second housing 3, which are so coupled through a bearing 4 as to rotate completely around relative to each other. In the first housing 2, there is supported by a bearing 6 an input shaft 5 which intersects the axis of rotation of the first housing 2 orthogonally. This input shaft 5 is formed integrally with a cylindrical portion 7. Into this cylindrical portion 7, there is inserted a first transmission shaft 8 which is coaxial with the input shaft 5. The first transmission shaft 8 has its one end supported by the input shaft 5 through a bearing 9 and its other end supported by a partition 11 through a bearing 10. On the outer circumference of the first transmission shaft 8, there is rotatably fitted a cylindrical second transmission shaft 12, which has its one end supported by the first transmission shaft 8 through a bearing 16a, its middle portion supported by the opening of the cylindrical portion 7 through a bearing 13, and its other end supported by the partition 11 through a bearing 16b. In the partition 11, moreover, there is supported through a bearing 15 a third transmission shaft 14 which is arranged in parallel with the first transmission shaft 8.

On the axis of relative rotations of the first housing 2 and the second housing 3, there is arranged an internal transmission shaft 17 which has its one end supported by the first housing 2 through a bearing 18 and its other end supported by the second housing 3 through a bearing 19. A cylindrical external transmission shaft 20 is rotatably fitted coaxially on the outer circumference of the internal transmission shaft 17. A bearing 21 is sandwiched between the outer circumference of the external transmission shaft 20 and the first housing 2. In the second housing 3, moreover, there is supported through a bearing 23 an output shaft 22 which is directed orthogonally to the axis of rotation of the second housing 3.

A plurality of bevel gears 25 are supported in the cylindrical portion 7 of the input shaft 5 by a bearing 24. The first transmission shaft 8 is equipped at its one end with a second bevel gear 26 meshing with the first bevel gear 25 and at its other end with a third bevel gear 27. The second transmission shaft 12 is equipped at its one end with a fourth bevel gear 28 meshing with the first bevel gear 25 and at its other end with a first spur gear 29. The third transmission shaft 14 is equipped at its one end with a second spur gear 30 meshing with the first spur gear 29 and at its other end with a fifth bevel gear 31. The internal transmission shaft 17 is equipped at its one end with a sixth bevel gear 32 meshing with the fifth bevel gear 31 and at its other end with a seventh bevel gear 33. The external transmission shaft 20 is equipped at its one end with an eighth bevel gear 34 meshing with the third bevel gear 27 and at its other end with a ninth bevel gear 35. Moreover, the output shaft 22 is equipped with a tenth bevel gear 36 which meshes with the seventh bevel gear 33 and the ninth bevel gear 35.

As a result, the cylindrical portion 7, the first transmission shaft 8, the second transmission shaft 12, the first bevel gear 25, the second bevel gear 26, the third bevel gear 27, the fourth bevel gear 28, the eighth bevel gear 34 and so on constitute altogether a differential gear train for transmitting the rotations between the input shaft 5, and the internal transmission shaft 17 and the external transmission shaft 20. On the other hand, the third transmission shaft 14, the first spur gear 29, the second spur gear 30, the fifth bevel gear 31, the sixth bevel gear 32 and so on constitute altogether a reversing gear train for rotating the internal transmission shaft 17 and the external transmission shaft 20 in the opposite directions to each other. Moreover, the differential gear train and the reversing gear train constitute together a second transmission mechanism of the present invention. On the other hand, the seventh bevel gear 33, the ninth bevel gear 35, the tenth bevel gear 36 and so on constitute altogether a first transmission mechanism for transmitting the rotations between the output shaft 22, and the internal transmission shaft 17 and the external transmission shaft 20 and for rotating the internal transmission shaft 17 and the external transmission shaft 20 in the opposite directions to each other in association with the reversing gear train.

Figure 2:
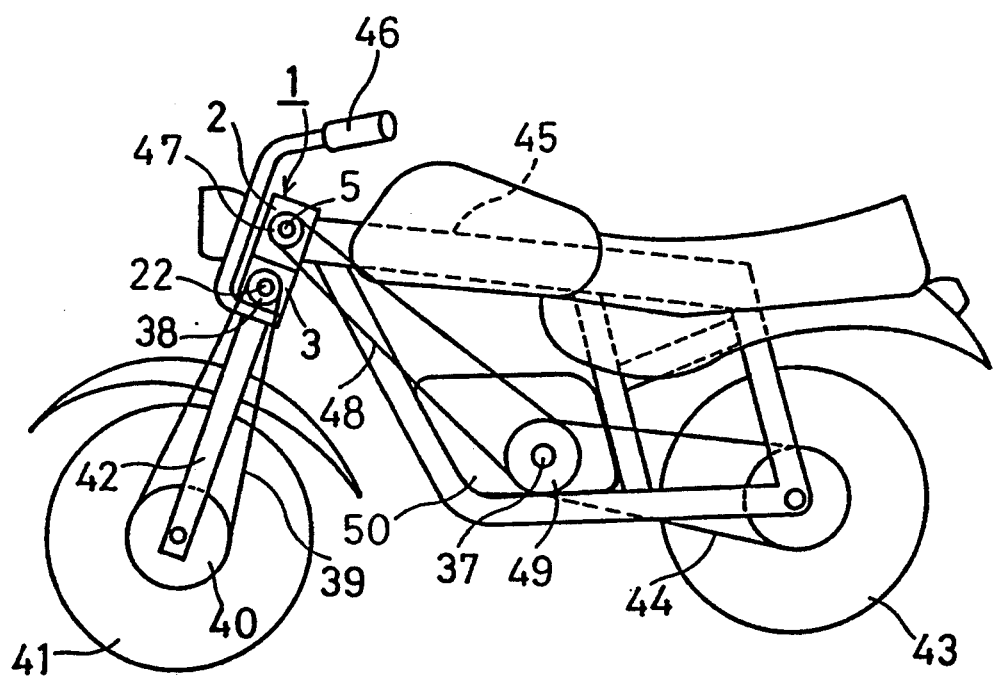
FIG. 2. is a front elevation of a motorcycle according to one example of application of the power transmission of FIG. 1.

The power transmission 1 thus constructed is mounted, for example, in a front wheel drive mechanism of a 2WD motorcycle, as shown in FIG. 2. Here, the power transmission 1 has its first housing 2 fixed on a body frame 45 and its second housing 3 assembled with a handle 46 and a front fork 42. In other words, the first and second housings 2 and 3 and their bearing 4 replace the head pipe and its bearing, which are arranged in the same corresponding positions of the motorcycle of the prior art. This replacement minimizes such an increase in the number and weight of those parts as is caused by mounting the present power transmission 1.

On the other hand, the input shaft 5 of the power transmission 1 is connected through an input sprocket 47, a drive chain 48 and a drive sprocket 49 to the drive shaft 37 of an engine 50. The output shaft 22 is connected through an output sprocket 38, a driven chain 39 and a driven sprocket 40 to a front wheel 41. A rear wheel 43 is connected through a chain 44 to the engine 50. Incidentally, the input shaft 5 can be connected to the engine 50 through other transmission means such as a belt or a spline shaft, and the output shaft 22 can be connected to the front wheel 41 through similar transmission means.

Next, the operations of the power transmission 1 of the present embodiment will be described in the following. When the input shaft 5 is rotated clockwise (as viewed from the righthand side of FIG. 1) by the engine 50, the cylindrical portion 7 is also rotated clockwise, but the first bevel gear 25 will not rotate on its own axis because it meshes with both the second bevel gear 26 and the fourth bevel gear 28. As a result, the first transmission shaft 8 and the third bevel gear 27 are rotated clockwise through the second bevel gear 26, and the second transmission shaft 12 is rotated clockwise through the fourth bevel gear 28, so that the third transmission shaft 14 and the fifth bevel gear 31 are rotated counter-clockwise through the first spur gear 29 and the second spur gear 30. The internal transmission shaft 17 and the seventh bevel gear 33 are rotated counter-clockwise (as viewed from the top of FIG. 1) through the sixth bevel gear 32 by the fifth bevel gear 31. On the other hand, the external transmission shaft 20 and the ninth bevel gear 35 are rotated clockwise (as viewed from the top of FIG. 1) through the eighth bevel gear 34 by the third bevel gear 27. As a result, the tenth bevel gear 36 and the output shaft 22 are rotated clockwise by the seventh bevel gear 33 and the ninth bevel gear 35 to drive the front wheel 41 forward.

If the engine 50 is accelerated or decelerated in this state, a torque fluctuation is caused in the input shaft 5. If the brake is applied or if the load surface condition changes, a load fluctuation is caused in the output shaft 22. However, these fluctuations are balanced as a result that the seventh bevel gear 33 meshing with the tenth bevel gear 36 and the internal transmission shaft 17 and the ninth bevel gear 35 meshing with the tenth bevel gear 36 and the external transmission shaft 20 rotate at equal speeds in opposite directions on the axis of relative rotations of the first and second housings 2 and 3. As a result, the first and second housings 2 and 3 are not subjected to any couple of forces by those fluctuations so that they do not rotate relative to each other. Unlike the conventional power transmission using the synchronized ball joint, therefore, the handle 46 will not become uncontrollable but can be steered reliably and safely.

When the input shaft 5 is rotated counter-clockwise, the individual parts are rotated in the directions opposed to those of the aforementioned case so that the motorcycle can be driven backward. In case the engine is braked by the vehicle, on the other hand, the internal transmission shaft 17 and the external transmission shaft 20 are rotated in the opposite directions to each other as the output shaft 22 rotates. As a result, the first transmission shaft 8 and the second transmission shaft 12 are rotated together in the same direction, and the first bevel gear 25 is rotated by the second bevel gear 26 and the fourth bevel gear 28. Thus, the power from the output shaft 22 is transmitted through the input shaft 5 to the engine 50 so that the braking on the engine effectively works.

If the second housing 3 is relatively rotated counter-clockwise, for example, on its own axis by steering the handle 46 while the aforementioned input shaft 5 and output shaft 22 are rotating, the internal transmission shaft 17 and the external transmission shaft 20 rotating in the opposite directions to each other have their rotating speeds made different (although the internal transmission shaft 17 and the external transmission shaft 20 will rotate in the same direction if the second housing 3 is relatively rotated while the input shaft 5 and the output shaft 22 stand still). However, this difference between the rotating speeds is that between the second bevel gear 26 and the fourth bevel gear 28 of the differential gear train in the second transmission mechanism so that it is absorbed by the rotation of the first bevel gear 25 on its own axis. As a result, no matter whether the motorcycle might be running or stopped, the relative rotation of the second housing 3 and the rotations of the input shaft 5 and the output shaft 22 can be completely isolated and kept away from interfering each other so that the handle 46 can be lightly steered.

Thus, according to the power transmission 1 of the present embodiment, the front wheel 41 can be so coupled to the body frame 45 as to rotate completely around and directed to any angular position within range of 360 degrees. At any steering angle, moreover, the rotation of the engine 50 can be always transmitted to the front wheel 41 independently of the fluctuation of the torque. Furthermore, since the input shaft 5 and the output shaft 22 are disposed in separate positions to provide a key-shaped construction as a whole, the power transmission 1 can be neatly mounted in a compact form between the body frame 45 and the front fork 42. Still moreover, the directions of the input shaft 5 and the output shaft 22 can be arbitrarily changed within the range of 360 degrees by turning the first and second housings 2 and 3 relative to each other so that the space for mounting the power transmission 1 should not be limited to that of the shown embodiment but can be freely selected in conformity to the structure of the front wheel drive mechanism of the motorcycle.

Figure 3:
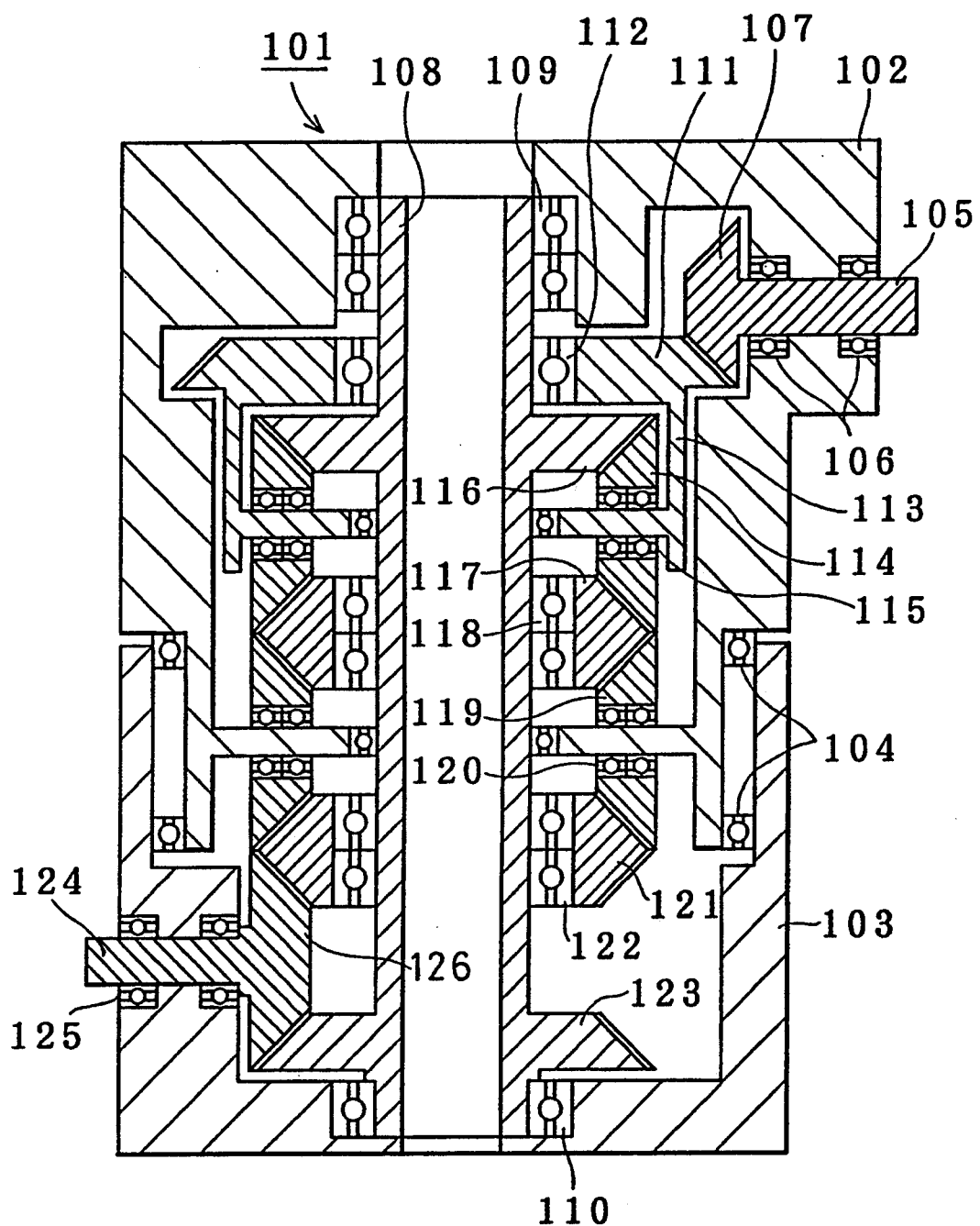
FIG. 3 is a section showing a power transmission of a second embodiment.

Next, a second embodiment of the present invention will be described with reference to FIG. 3. A power transmission 101 of the present embodiment is equipped with a first housing 102 and a second housing 103, which are so coupled through a bearing 104 as to rotate relative to each other completely around. In the first housing 102, there is supported through a bearing 106 an input shaft 105 which is arranged at a right angle with respect to the axis of rotation of the first housing 102. The input shaft 105 is equipped with a first bevel gear 107.

On the axis of rotations of the first housing 102 and the second housing 103, there is disposed a hollow internal transmission shaft 108, which has its one end supported in the first housing 102 by a bearing 109 and its other end supported in the second housing 103 by a bearing 110. On the upper portion of the internal transmission shaft 108, there is supported by a bearing 112 a second bevel gear 111 which meshes with the first bevel gear 107. The second bevel gear 111 is integrally formed with a cylindrical portion 113, in which are supported a plurality of third bevel gears 114 by a bearing 115. The internal transmission shaft 108 is integrally formed below the second bevel gear 111 with a fourth bevel gear 116 which meshes with the third bevel gear 114. Below the fourth bevel gear 116, there is supported by a bearing 118 a fifth double bevel gear 117 which is shaped to have its two bevel gears facing back to back vertically and which has its upper gear meshing with the third bevel gear 114.

In the lower portion of the first housing 102, there are supported by a bearing 120 a plurality of sixth bevel gears 119 which mesh with the lower side of the fifth double bevel gear 117. Moreover, on the internal transmission shaft 108 and below the fifth double bevel gear 117, there is supported by a bearing 122 a seventh double bevel gear 121 which has its upper side meshing with the sixth bevel gear 119 so that it acts as an external transmission path. The internal transmission shaft 108 is integrally formed with an eighth bevel gear 123 below the seventh double bevel gear 121. In the second housing 103, furthermore, there is supported by a bearing 125 an output shaft 124 which is directed at a right angle with respect to the axis of rotation of the second housing 103. The output shaft 124 is equipped with a ninth bevel gear 126 which meshes with the lower side of the seventh bevel gear 121 and the eighth bevel gear 123.

As a result, the aforementioned cylindrical portion 113, third bevel gear 114, fourth bevel gear 116 and fifth double bevel gear 117 and so on constitute altogether a differential gear train for transmitting the power between the input shaft 105, and the internal transmission shaft 108 and the seventh double bevel gear 121. On the other hand, the fifth double bevel gear 117, the sixth bevel gear 119 and so on constitute together a reversing gear train for rotating the internal transmission shaft 108 and the seventh double bevel gear 121 in the opposite directions to each other. And, these differential gear train and reversing gear train constitute together a second transmission mechanism of the present invention. On the other hand, the seventh double bevel gear 121, the eighth bevel gear 123, the ninth bevel gear 126 and so on constitute altogether a first transmission mechanism for transmitting the power between the output shaft 124, and the internal transmission shaft 108 and the seventh double bevel gear 121 and for rotating the internal transmission shaft 108 and the seventh double bevel gear 121 in the opposite directions to each other in association with the reversing gear train. It can be appreciated that bevel gears 121 and 123 are mounted individually on the internal transmission shaft 108, and mesh with bevel gear 126 simultaneously. It can also be appreciated that bevel gear 123 is fixed to shaft 108, and that bevel gear 121 is not.

The power transmission 101 of the present embodiment operates in the following manner. When the input shaft 105 is rotated clockwise, for example, the second bevel gear 111, the cylindrical portion 113, the fourth bevel gear 116, the internal transmission shaft 108, the fifth double bevel gear 117 and so on are rotated altogether clockwise whereas the seventh double bevel gear 121 is rotated counter-clockwise through the sixth bevel gear 119. And, the ninth bevel gear 126 and the output shaft 124 are rotated clockwise by the eighth bevel gear 123 and the seventh double bevel gear 121. The torque fluctuation of the input shaft 105 and the load fluctuation of the output shaft 124 thus caused are balanced as a result that the eighth bevel gear 123 meshing with the ninth bevel gear 126 and the internal transmission shaft 108, and the seventh bevel gear 121 meshing with the ninth bevel gear 126 are rotated at the same speed in the opposite directions on the axis of relative rotations of the first and second housings 102 and 103. Thus, the second housing 103 is kept away from any relative rotation.

On the other hand, if the second housing 103 is relatively rotated counter-clockwise, for example, the internal transmission shaft 108 and the seventh bevel gear 121 rotating in the opposite directions to each other have their rotating speeds made different. This difference in the rotating speed is that between the fourth bevel gear 116 and the fifth double bevel gear 117 of the differential gear train in the second transmission mechanism and is absorbed by the rotation of the third bevel gear 114 on its own axis. As a result, the relative rotation of the second housing 103 and the rotations of the input shaft 105 and the output shaft 124 are completely isolated and kept away from any interference.

As a result, effects similar to those of the first embodiment can also be achieved by mounting the present embodiment on a motorcycle as in the first embodiment. Moreover, the shaft of the handle can be inserted into the hollow portion of the internal transmission shaft 108.

Figure 4:
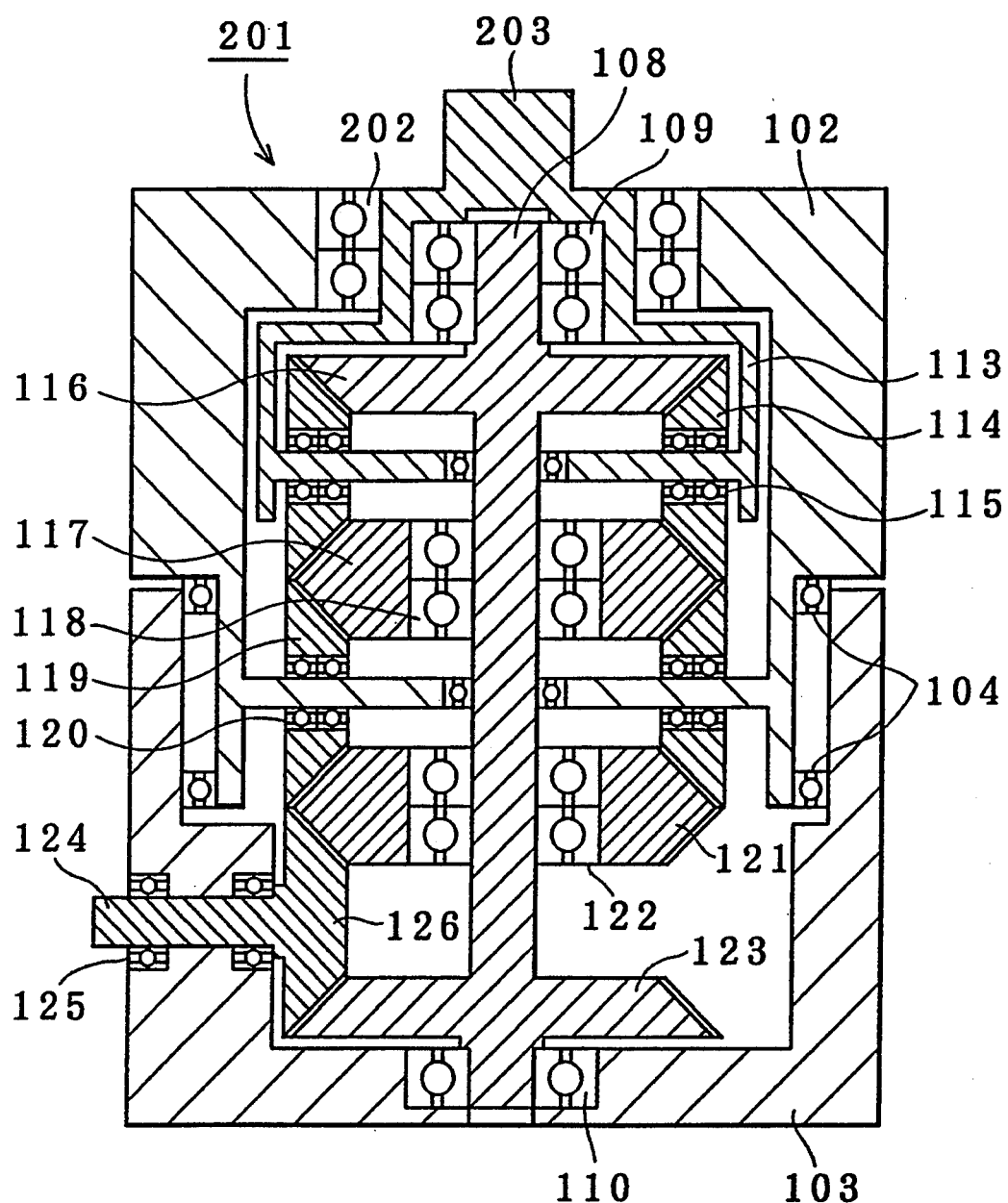
FIG. 4 is a section showing a power transmission of a third embodiment.

Next, a third embodiment of the present invention will be described with reference to FIG. 4. A power transmission 201 of the present embodiment is different from that of the second embodiment only: in that the first bevel gear 107 and the second bevel gear 111 of the second embodiment are omitted to couple an input shaft 203, which is supported through a bearing 202 on the axis of rotation of the first housing 102, directly to the cylindrical portion 113; and in that the internal transmission shaft 108 adopted is made solid. Hence, the remaining portions are designated at reference numerals similar to those of FIG. 3 in FIG. 4, and their common description will be omitted. The present embodiment can achieve operations/effects similar to those of the second embodiment, excepting that the direction of the input shaft is different.

Figure 5:
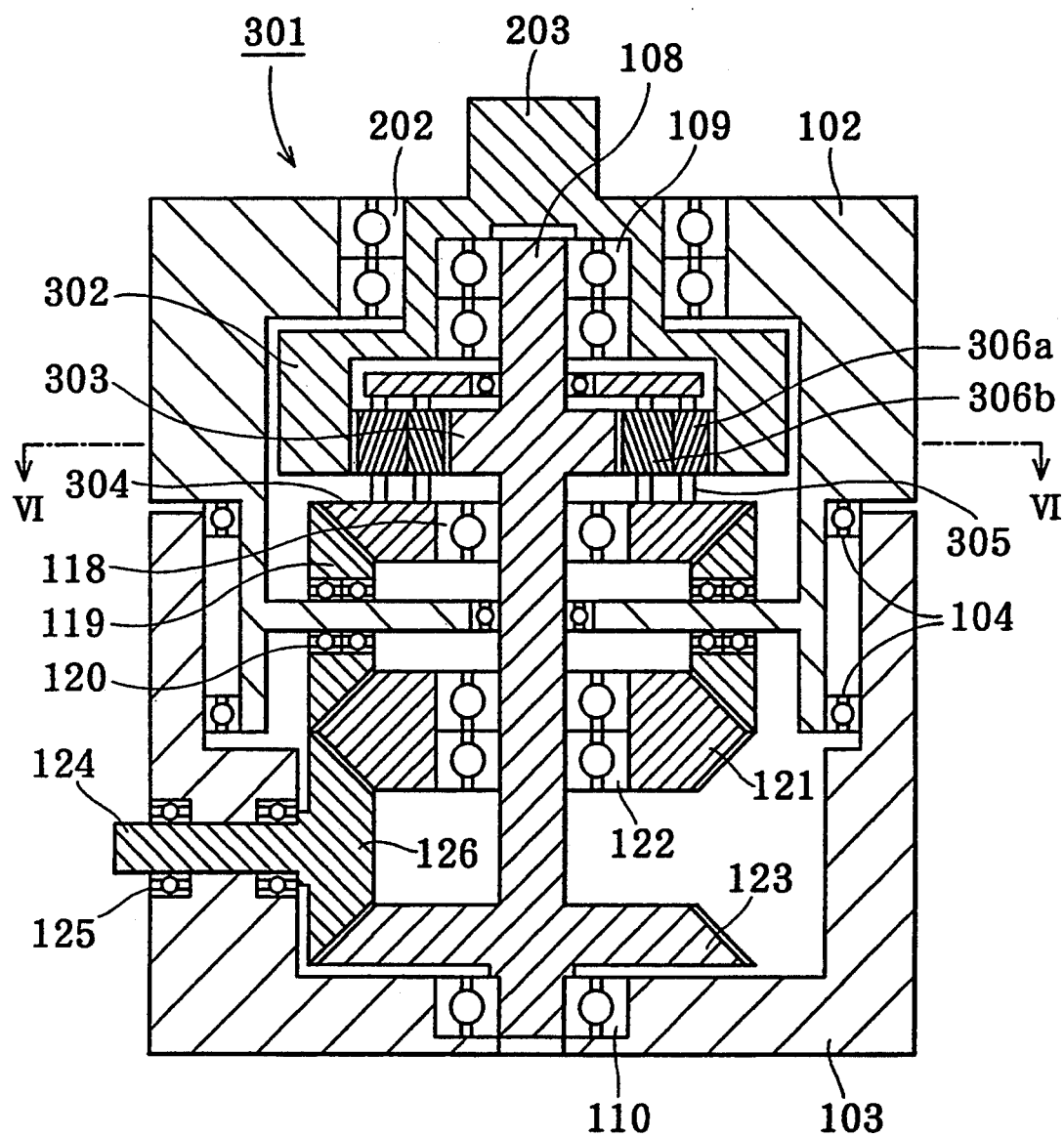
FIG. 5 is a section showing a power transmission of a fourth embodiment ;.
Figure 6:
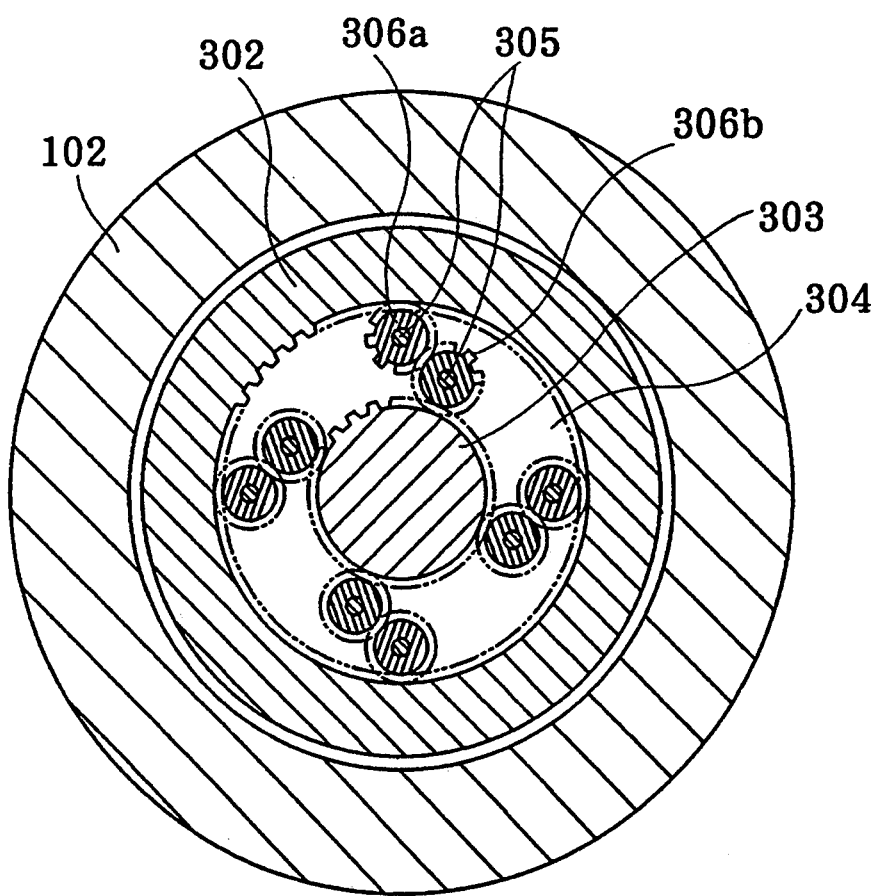
FIG. 6 is a section taken along line VI—VI of FIG. 5.

Next, a fourth embodiment of the present invention will be described with reference to FIGS. 5 and 6. The power transmission 301 of the present embodiment is different from that of the third embodiment only in that the differential gear train of the second transmission mechanism of the third embodiment, which is composed of the cylindrical portion 113, the third bevel gear 114, the fourth bevel gear 116, the fifth double bevel gear 117 and so on, is replaced by the following differential gear train of double pinion planetary gear type.

Specifically: the aforementioned cylindrical portion 113 is replaced by a ring gear 302 which has teeth on its inner circumference and which is formed integrally with the input shaft 203; the aforementioned fourth bevel gear 116 is replaced by a sun gear 303 which is formed integrally with the internal transmission shaft 108; and the aforementioned fifth double bevel gear 117 is replaced by a fifth bevel gear 304 which is supported through the bearing 118 by the internal transmission shaft 108. Moreover, a plurality of pairs of pinion gears 306a and 306b are fitted rotatably on a plurality of pins 305 which are erected from the fifth bevel gear 304. The paired pinion gears 306a and 306b mesh with each other, and the former 306a further meshes with the ring gear 302 whereas the latter 306b further meshes with the sun gear 303. The common description of the remaining parts will be omitted by designating them at reference numerals similar to those of FIG. 4 in FIG. 5.

The power transmission 301 of the present embodiment operates in the following manner. When the input shaft 203 is rotated clockwise (as viewed from the top of FIG. 5), for example, the ring gear 302, the sun gear 303, the internal transmission shaft 108, the eighth bevel gear 123, the fifth bevel gear 304 and so on are rotated altogether clockwise. This is because the pinion gears 306a and 206b will not rotate around the pins 305. And, the seventh double bevel gear 121 is rotated counter-clockwise through the sixth bevel gear 119 so that the ninth bevel gear 126 and the output shaft 124 are rotated clockwise by the eighth bevel gear 123 and the seventh double bevel gear 121.

On the other hand, when the second housing 103 is relatively rotated counter-clockwise (as viewed from the top of FIG. 5), for example, the internal transmission shaft 108 and the seventh bevel gear 121 rotating in opposite directions to each other have their rotating speeds different from each other. This difference between the rotating speeds becomes that between the sun gear 303 and the fifth bevel gear 304 of the differential gear train in the second transmission mechanism and is absorbed by the rotations of the pinion gears 306a and 206b around the pins 305. As a result, the relative rotation of the second housing 103 and the rotations of the input shaft 105 and the output shaft 124 are completely isolated and kept away from any interference.

Thus, effects similar to those of the first embodiment can also be achieved in the present embodiment. Since the aforementioned double pinion planetary gear type capable of having a lower height is adopted as the differential gear train of the second transmission mechanism, the present embodiment has an advantage that the entire construction can be made more compact than that of the third embodiment. It can also be appreciated that in the second, third and fourth embodiments, the first and second transmission mechanisms are disposed concentrically and coaxially with respect to each other.

Figure 7:
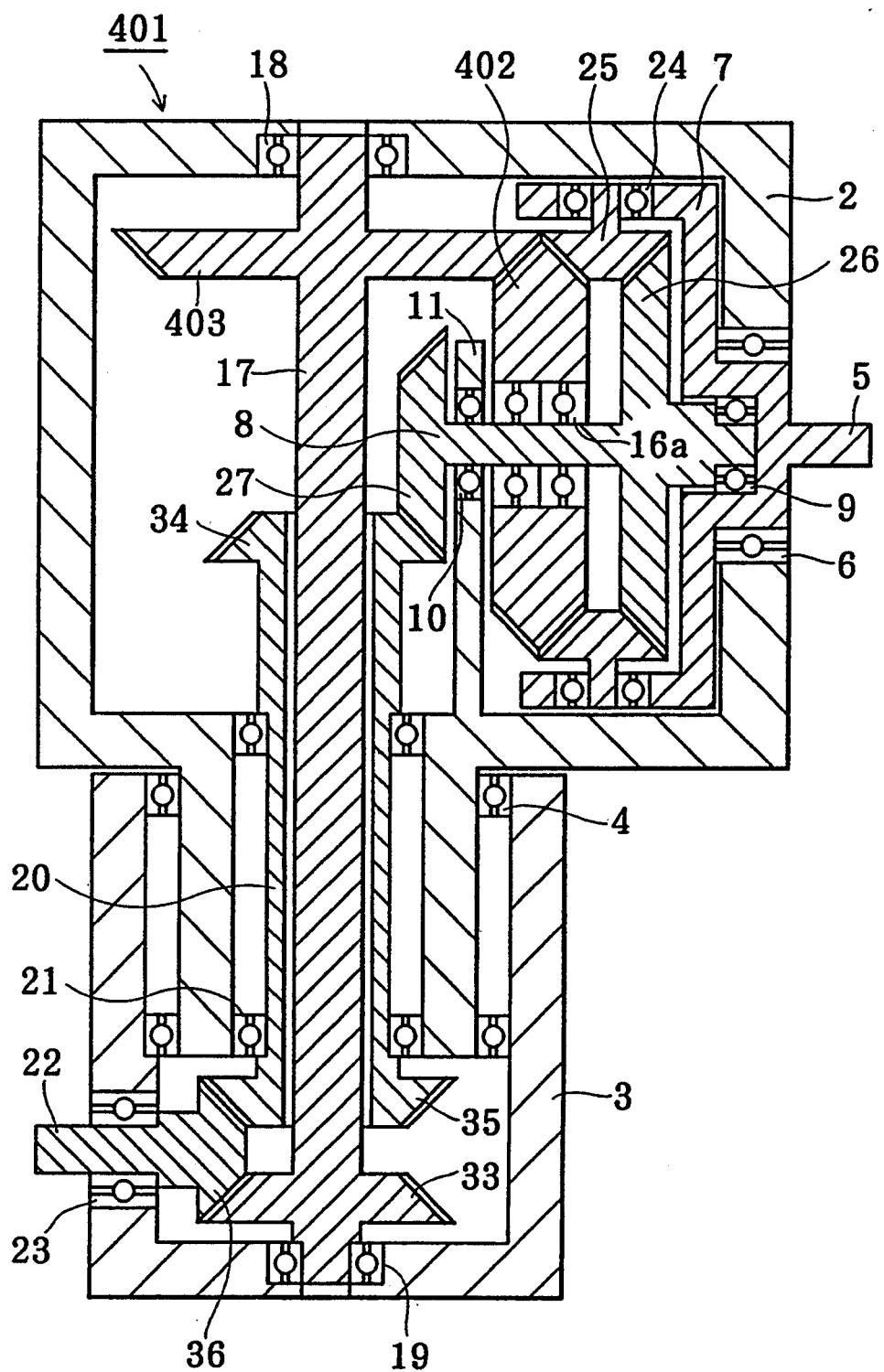
FIG. 7 is a section showing a power transmission of a fifth embodiment.

Next, a fifth embodiment of the present invention will be described with reference to FIG. 7. A power transmission 401 of the present embodiment is different from that of the first embodiment only in that the reversing gear train in the second transmission mechanism of the first embodiment is partially modified in the following manner.

Specifically, a fourth double bevel gear 402 is supported in place of the aforementioned fourth bevel gear 28 on the first transmission shaft 8 by the bearing 16a, and has its lefthand side meshing directly with a sixth bevel gear 403 which is fixed downward on the upper end of the internal transmission shaft 17. Incidentally, the gear ratio (as exemplified by 1:1 in FIG. 7) between the lefthand side of the fourth double bevel gear 402 and the sixth bevel gear 403 and the gear ratio (as exemplified by 1:1 in FIG. 7) between the third bevel gear 27 and the eighth bevel gear 34 are equal.

As a result, effects similar to those of the first embodiment can also be achieved in the present embodiment. According to present embodiment, moreover, the second transmission shaft 12, the third transmission shaft 14, the first spur gear 29, the second spur gear 30, the fifth bevel gear 31 and so on of the first embodiment can be omitted to reduce the number of parts, the size and the cost.

Figure 8:
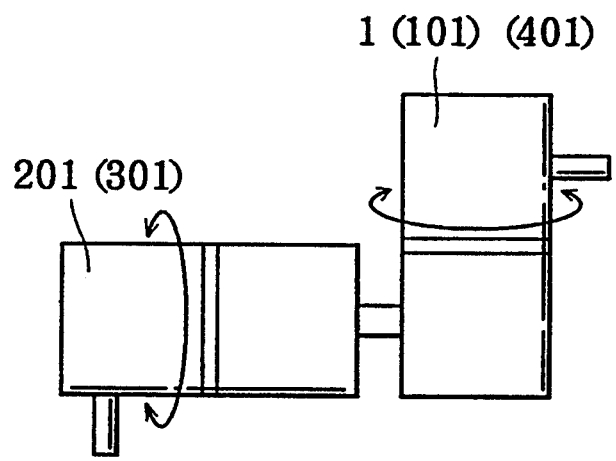
FIG. 8 is a front elevation showing a combined example of the power transmissions of the first to fifth embodiments.
Figure 9:
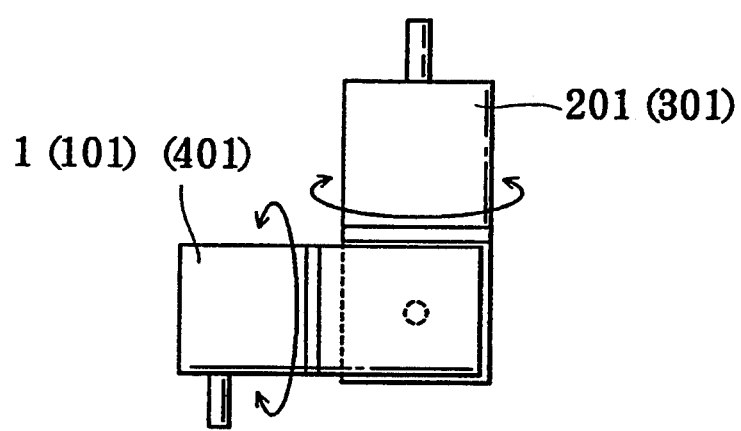
FIG. 9 is a front elevation showing another combined example of the power transmissions of the first to fifth embodiments.
Figure 10:
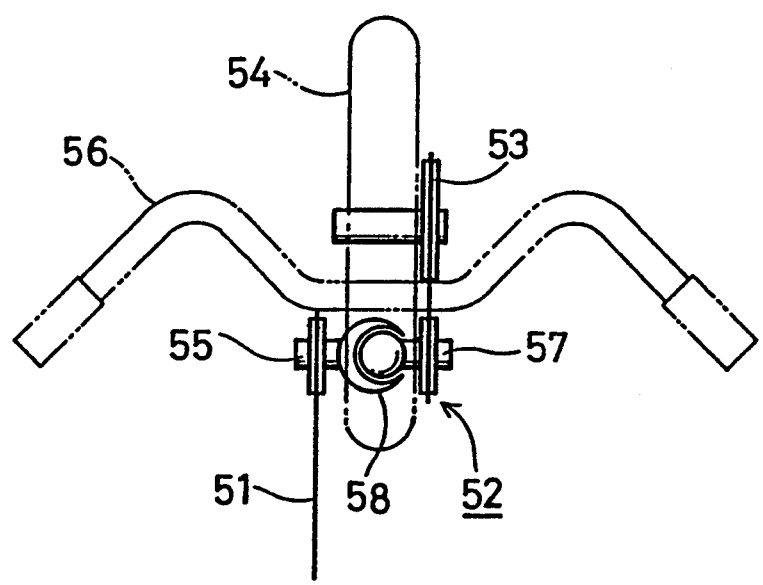
FIG. 10 is a top plan view showing the front wheel drive mechanism which is equipped with the power transmission of the prior art.

Here, the present invention can be embodied by modifying the shapes and constructions of the individual portions, as follows, for example, without departing from the gist thereof:

(1) By combining two or more of the power transmissions 1, 101, 201, 301 and 401 of the embodiments, as shown in FIGS. 8 and 9, the drive unit and the driven unit can have their directions changed more freely;

(2) Although the constructions for bearing the thrusts of the individual gears are omitted for simplified illustrations from the individual Figures showing the embodiments, it is naturally possible to use a variety of well-known thrust bearings;

(3) The tooth traces of the individual gears of the embodiments should not be limited to the specified ones but can be suitably selected from those of spurgears, helical gears, double helical gears, straight gears, spiral gears and so on;

(4) The gears in the first transmission mechanism or the second transmission mechanism of the embodiments can also be partially or wholly replaced by power transmitting mechanical elements other than the gears, such as belt and pulleys, chains and sprocket wheels, or elastic rollers; and (5) The applications of the power transmission of the present invention should not be limited to the motorcycle, as in the embodiments, but can be applied a variety of mechanisms, as exemplified in "Field of the Invention".

As many apparently widely different embodiments of this invention may be made without departing from the spirit and scope thereof, it is to be understood that the invention is not limited to the specific embodiments thereof except as defined in the appended claims.

What is claimed is:

1. A power transmission comprising:
   a first housing and a second housing coupled to rotate relative to each other;
   a first external connecting shaft rotatably disposed in said first housing;
   a second external connecting shaft rotatably disposed in said second housing;
   an internal transmission shaft and an external transmission gear concentrically arranged on the axis of relative rotation of said first and second housings;
   a first transmission mechanism for transmitting rotations between said first external connecting shaft, and said internal transmission shaft and said external transmission gear to rotate said internal transmission shaft and said external transmission gear in opposite directions relative to each other;
   a second transmission mechanism for transmitting rotations between said second external connecting shaft, and said internal transmission shaft and said external transmission gear to rotate said internal transmission shaft and said external transmission gear in opposite directions relative to each other, and for absorbing the difference, which is caused by the relative rotation of said first and second housings, between the rotating speeds of said internal transmission shaft and said external transmission gear;
   wherein said first and second transmission mechanisms are disposed on an outer circumference of said internal transmission shaft coaxially with each other.

2. A power transmission according to claim 1, wherein said first and second housings are so coupled as to rotate completely around without any angular limitation relative to each other.

3. A power transmission according to claim 1, wherein said first and second housings are so coupled as to rotate within a predetermined angular range relative to each other.

4. A power transmission according to claim 1, wherein said first transmission mechanism includes a bevel gear fixedly mounted on one of said first external connecting shaft and said second external connecting shaft, and at least two bevel gears disposed about said internal transmission shaft with at least one of said at least two bevel gears being fixed to said internal transmission shaft, said at least two bevel gears meshing with said bevel gear simultaneously.

5. A power transmission according to claim 1, wherein said second transmission mechanism includes a differential train having a bevel gear rotatable on its own axis for absorbing the difference, which is caused by relative rotation of said first and second housings, between rotating speeds of said internal transmission shaft and external transmission gear.

6. A power transmission according to claim 5, wherein said differential train is constructed to have bevel gears.

7. A power transmission according to claim 5, wherein said differential train is constructed of a double pinion planetary gear train.

8. A power transmission according to claim 1 wherein both said first and second external connecting shafts are disposed so as to be directed at right angles with respect to the axis of relative rotation of said first and second housings.

9. A power transmission according to claim 1, wherein said first external connecting shaft is disposed so as to be directed at substantially a right angle with respect to said second external connecting shaft.

10. A power transmission according to claim 11, further comprising a plurality of said power transmissions wherein an external connecting shaft of each of said power transmissions is coupled with an external connecting shaft of another of said power transmissions.

* * * * *